(12) United States Patent
Forssell et al.

(10) Patent No.: US 7,227,839 B2
(45) Date of Patent: Jun. 5, 2007

(54) RESOURCE ALLOCATION IN PACKET-FORMAT COMMUNICATION

(75) Inventors: Mika Forssell, Espoo (FI); Jussi Rajala, Espoo (FI)

(73) Assignee: Nokia Corporation, Espoo (FI)

( * ) Notice: Subject to any disclaimer, the term of this patent is extended or adjusted under 35 U.S.C. 154(b) by 912 days.

(21) Appl. No.: 10/048,303

(22) PCT Filed: Jun. 8, 2001

(86) PCT No.: PCT/FI01/00542

§ 371 (c)(1),
(2), (4) Date: Jan. 25, 2002

(87) PCT Pub. No.: WO01/99353

PCT Pub. Date: Dec. 27, 2001

(65) Prior Publication Data

US 2002/0105940 A1    Aug. 8, 2002

(30) Foreign Application Priority Data

Jun. 20, 2000  (FI)  .................................. 20001469

(51) Int. Cl.
*G08C 15/00*  (2006.01)
(52) U.S. Cl. ...................... 370/229; 370/277; 370/341; 370/231
(58) Field of Classification Search ................ 370/229, 370/230.1, 231, 235, 277, 329, 341, 431, 370/433, 352; 455/242.2, 24, 91, 115.1, 455/73, 550.1
See application file for complete search history.

(56) References Cited

U.S. PATENT DOCUMENTS 5,574,774 A * 11/1996 Ahlberg et al. .......... 455/422.1

(Continued)

FOREIGN PATENT DOCUMENTS

EP    1021017 A2    7/2000

(Continued)

OTHER PUBLICATIONS

Puharinen, Jarkko. "GPRS Radio Interface—Radio Link Control Details in GPRS" [online]. 8309700 Advanced Topics in Telecommunications Report, Apr. 7, 2000, Tampere University of Technology [retrieved on Oct. 16, 2001]. Retrieved from the Internet: <URL: www.cs.tut.fi/kurssit/8309700/reports/puharinen.pdf >. Chapter 4 and 8.

*Primary Examiner*—Wing Chan
*Assistant Examiner*—Nguyen Ngo
(74) *Attorney, Agent, or Firm*—Ware, Fressola, Van Der Sluys & Adolpson, LLP

(57) ABSTRACT

The invention relates to arranging the transmission of packets between a mobile communication device and a mobile communication network. At least one temporary block flow is set up, and data is transmitted in packets in packet data traffic channels in a first direction from the mobile communication device to the mobile communication network. At the end of the transmission, information about the end of the block flow is set in the last packet, wherein the receiver of the packets acknowledges packet reception. After the end of the transmission of packets in said first direction, a determined time is waited until an acknowledgement is transmitted. If, while waiting, the mobile communication network detects a need for transmission of packets in the second direction from the mobile communication network to the mobile communication device, at least one packet data traffic channel is set up for data transmission in said second direction.

29 Claims, 4 Drawing Sheets

U.S. PATENT DOCUMENTS

| | | | |
|---|---|---|---|
| 6,151,137 A * | 11/2000 | Henrick | 358/434 |
| 6,683,860 B1 * | 1/2004 | Forssell et al. | 370/329 |
| 6,718,179 B1 * | 4/2004 | Forssell et al. | 455/509 |
| 6,901,060 B1 * | 5/2005 | Lintulampi | 370/329 |
| 6,928,289 B1 * | 8/2005 | Cho et al. | 455/452.2 |
| 6,963,544 B1 * | 11/2005 | Balachandran et al. | 370/281 |
| 2001/0038614 A1 * | 11/2001 | Hautamaki et al. | 370/324 |
| 2002/0045458 A1 * | 4/2002 | Parantainen et al. | 455/466 |
| 2005/0105479 A1 * | 5/2005 | Vanttinen et al. | 370/278 |

FOREIGN PATENT DOCUMENTS

| | | |
|---|---|---|
| WO | WO 00/01173 | 1/2000 |
| WO | WO 00/62491 | 10/2000 |

* cited by examiner

RESOURCE ALLOCATION IN PACKET-FORMAT COMMUNICATION

BACKGROUND OF THE INVENTION

The present invention relates to a method according to the preamble of the appended claim 1, a communication system according to the preamble of the appended claim 10, and a network element according to the preamble of the appended claim 24.

The term "wireless communication system" generally refers to any communication system which makes a wireless data transmission connection possible between a mobile station (MS) and stationary parts of the system when the user of the mobile station is moving within the operating range of the system. A typical wireless communication system is a public land mobile network PLMN. A major part of wireless communication systems at the time of filing of this application belong to so-called second-generation mobile communication systems, of which one example to be mentioned is the widely known Global System for Mobile telecommunications (GSM). The present invention is particularly well suitable for packet switched mobile communication systems under development. In this description, the General Packet Radio Service (GPRS) system will be used as an example of such a mobile communication system whose standardization is presently under way. It is obvious that the invention can also be applied in other mobile communication systems applying packet switched communication.

The general packet radio service GPRS is a new service under development in the GSM mobile communication system. The operational environment of the GPRS system comprises one or several subnetwork service areas which are combined to a GPRS backbone network. The subnetwork comprises several support nodes (SN), such as serving GPRS support nodes (SGSN). Further, the packet network comprises a packet control unit PCU which is connected to the mobile communication network (typically via a connection unit to a base transceiver station) in such a way that it can offer packet switching services to mobile stations via base transceiver stations (cells). In practical systems, a packet control unit is preferably located in a base transceiver station, in a base station controller, or in a serving support node. The mobile communication network offers the transmission of packet-switched information between the support node and the mobile station. The different subnetworks are, in turn, connected via GPRS gateway support nodes (GGSN) to an external data network, such as a public switched data network (PSDN). Thus, the GPRS services facilitates the transmission of packet-format information between the mobile station and the external data network, wherein certain parts of the mobile communication network constitute an access network.

To use GPRS services, the mobile station first performs logging in the network (GPRS attach), whereby the mobile station reports that it is ready for packet data transmission. The login makes a logical link between the mobile station and the support node SGSN, facilitating the transmission of short message services (SMS) via the GPRS network, paging services via the support node, and informing about incoming packet data to the mobile station. In connection with login of the mobile station, the support node also performs mobility management (MM) and user identification. To transmit and receive data, a packet data protocol (PDP) is activated, whereby the mobile station is allocated a packet data address to be used in the packet data connection, wherein the address of the mobile station is known in a gateway support node. Consequently, in the login, a data transmission connection is set up to the mobile station, to the support node and to the gateway support node, the connection being allocated a protocol (for example X.25 or IP), a connection address (e.g. X.121 address), quality of service, and a network service access point identifier (NSAPI). The mobile station activates the packet data connection by an activate PDP context request, in which the mobile station gives the temporary logical link identity (TLLI), the packet data connection type, the address, the required quality of service, the network service access point identifier, and possibly also an access point name (APN).

The quality of service determines e.g. the way in which packets (packet data units, PDU) are processed during the transmission in the GPRS network. For example, quality of service levels determined for connection addresses are used to control the order of transmission, buffering (packet strings) and rejection of packets in the support node and in the gateway support node particularly in situations in which there are packets to be transmitted in two or more connections simultaneously. Different quality of service classes determine different delays for the transfer of packets between different ends of the connection, different bit rates, and the number of packets to be rejected can be different in connections with different quality of service. In the GPRS system, four quality of service classes are formed to define the quality of service offered by the LLC layer for a connection.

Reliability determines if acknowledgement (ARQ) is or is not (no ARQ) used in the logical link control layer LLC and in the radio link layer RLC in the communication. Furthermore, reliability is used to define whether protected mode is used in unacknowledged data transmission and whether the GPRS backbone network applies the TCP or UDP protocol in the transmission of packets belonging to the connection.

The appended FIG. 1 shows the operation of a known LLC protocol layer 101 in a mobile station and in a GPRS support node. Block 102 shows the operations of a known RLC/MAC (radio link control/media access control) layer which are needed between the LLC layer 101 and the mobile station (not shown in FIG. 1). In a corresponding manner, block 103 shows functions of a known BSSGP (base station subsystem GPRS part) layer which are needed between the LLC layer 101 and the packet control unit PCU (not shown in FIG. 1). The interface between the LLC layer 101 and the RLC/MAC layers is called RR interface, and the interface between the LLC layer 101 and the BSSGP layers is called BSSGP interface.

Above the LLC layer 101, there are known GPRS mobility management functions 104, SNDCP functions 105 and short message service functions 106 which belong to layer 3 in this presented layer structure. Each of these blocks have one or several connections to the LLC layer 101 for coupling to its different parts. The logical link management block 107 has an LLGMM control connection (Logical Link—GPRS Mobility Management) to the block 104. Mobility management data is routed via the LLGMM connection between the blocks 104 and the first LLE (logical link entity) block of the LLC layer. The second 109, third 110, fourth 111 and fifth 112 LLE blocks are coupled to the block 105 via respective connections. These blocks are also called QoS 1, QoS 2, QoS 3 and QoS 4 according to the quality of service of the packets processed by these blocks. The sixth LLE block 113 of the LLC layer is coupled to the block 106 via an LLSMS (Logical Link—Short Message Service) connection. The service access point identifiers of the first 108, second 109, third 110, fourth 111, fifth 112, and sixth LLE blocks are 1, 3, 5, 9, 11, and 7, respectively. Each of these LLE blocks is connected in the LLC layer to a multiplexing block 114 which processes connections via the RR interface to the block 102 and further to the mobile station, as also connections via the BSSGP connection and the BSSGP block 103 to the radio system. The BSSGP block 103 is needed for the transmission of messages between the serving support node SGSN and the radio system.

The connection between the multiplexing block 114 and the block 102 of the lower layer in the direction of the mobile station is called a transmission pipe. All packet flows between the upper parts of the LLC layer and the lower layers 102 pass through the same multiplexing block 114 and the transmission pipe. For packet data transmission of the LLC layer 101, it is possible in the GPRS system to set up temporary block flows (TBF) between the mobile station and the mobile communication network. Setting up of such a temporary block flow can be started by either the mobile station or the mobile communication network. These temporary block flows are temporary block flows of the RLC/MAC layer in which information of the LLC layer is transmitted. The temporary block flow can be intended for data transmission either from the mobile communication network to the mobile station, of which the abbreviation DL TBF (downlink TBF) is used in the signalling charts of FIGS. 2, 3a and 3b and which is also called downlink in this description, or from the mobile station to the mobile communication network, wherein the abbreviation UL TBF (uplink TBF) is used respectively and which is also called uplink in this description.

FIG. 2 shows, in a signalling chart, temporary block flows applying packet data transmission according to prior art. If the mobile station has, in idle mode, packets to be transmitted, the mobile station cannot directly start the transmission of these packets, but the mobile station must first be switched from the idle mode to the active mode (packet transmission mode). After this, the mobile station starts the measures for setting up a temporary packet connection on a control channel, such as PCCCH or CCCH control channel (block 201). The transfer 205 of packets from the mobile station to the mobile communication network can be started after a temporary block flow has been set up. The signalling to be formed in the set-up is represented by arrows 202 and 203, and packet channel configuration by block 204. In connection with uplink packets, the GPRS system applies a countdown value CV whereby the mobile station MS can inform the mobile communication network when the uplink transmission is ending. Thus, the mobile station MS sets, in the last packet to be transmitted (arrow 206), information about ending of uplink packets, e.g. the final bit in the packet countdown value in the packet header to the value zero. Thus, the mobile communication network NW knows that this was the last packet to be received in this packet flow. After the transmission of the packets, and if RLC acknowledged mode was used in the packet flow, the mobile communication network transmits an acknowledgement message Packet Uplink Ack/Nack (arrow 207), in which the final bit (Final Ack Indicator, FAI) is set to the value true, preferably logical 1 state. This final bit value indicates to the mobile station that no (more) packet retransmissions are needed, but all the packets have been received. After this, the packet flow is unpacked.

When the mobile communication network receives a packet of the LLC layer addressed to the mobile station, the mobile communication network must form a temporary block flow from the base station to the mobile station for the transmission of the packet, if there is not already an existing temporary block flow. The block flow is preferably set up by means of a control channel, such as PCCCH or CCCH, by configuring a packet data traffic channel PDTCH. This is illustrated by block 208 in FIG. 2. After the packet of the LLC layer has been received in the packet control unit, the international mobile subscriber identity (IMSI) and possible parameters related to discontinuous reception (DRX) are used to find out in which time slot of the control channel it is possible to perform configuration, preferably the transmission of a channel allocation message (Packet Downlink Assignment). The calculation of this moment of time can be implemented in the packet control unit PDU, in the base station BTS or in another part of the mobile communication network. After the temporary block flow has been set up, the transmission of packets is started (arrow 209). For receiving packets, the mobile station switches over to a packet transfer mode and starts to listen to the packet data channel and to receive packets. Each RLC packet transmitted by the mobile communication network to the mobile station contains a final block indicator (FBI). The purpose of this final block indicator is to inform the mobile station when the mobile communication network has no more information to be transmitted in the block flow to the mobile station, wherein this temporary block flow can be terminated.

The mobile communication network sets information on this in the last packet to be transmitted (arrow 210), e.g. the final bit of the packets to the value true (e.g. logical 1 state). In this way, the mobile station will know that this was the last packet to be received in this block flow. This packet also contains a relative reserved block period (RRBP) in which the mobile communication network can inform the mobile station in which time slot the mobile station can transmit an acknowledgement message. After receiving this last packet, the mobile station transmits an acknowledgement message (211) to the mobile communication network in the allocated time slot and starts a timer (block 212), such as T3192 in the GPRS system, for time control. If RLC acknowledged mode was used in the block flow, the mobile station transmits a Packet Downlink Ack/Nack message in which the Final Ack Indicator (FAI) is set to the value true, preferably logical 1 state. This final ack indicator informs to the mobile communication network that no (more) retransmissions of packets are needed, but all the packets have been received. If RLC Unacknowledged Mode was used in the block flow, the mobile station transmits a Packet Control Ack message. The mobile station continues to listen to the packet data traffic channel PDTCH in case the mobile station should retransmit the acknowledgement message, until the time set in the timer T3192 has expired. After this, the mobile station preferably switches over to the idle mode.

A timer is also started in the mobile communication network, e.g. T3193 in the GPRS system, after the mobile communication network has received said acknowledgement message from the mobile station. After the time set in the timer has expired, the mobile communication network deallocates the temporary block flow.

A problem in this arrangement is, for example, that the mobile communication network may have to wait for the transmission of the channel allocation message. This may be, for example, due to the fact that the mobile communication network has set the mobile station in the mode of discontinuous reception, wherein the mobile station only listens to the control channel at certain times. The purpose of this arrangement is to reduce the power consumption of the mobile station. At the base station, there may also be several messages in a string to be transmitted in the same time slot of the control channel. Thus, depending on the parameters related to discontinuous reception as well as the loading of the base station at the moment, there can be a delay of several seconds, even about 15 seconds, in the transmission of the channel allocation message in a mobile communication network according to e.g. the GPRS system. This causes a considerably long delay in the data transmission. Furthermore, this delay can cause problems in the data transmission. For example, an application from which the packets are transmitted or in which packets are received, may conclude from the long delay that the connection to the other party is no longer in order. Thus, the application may terminate the data transmission. Such a situation may occur for example when an application being run in the mobile station has transmitted, via the mobile communication network to the other party, e.g. a server connected in the Internet data network, information, an inquiry etc., to which the application expects to receive a reply. If there are no existing temporary data transmission flows between the mobile station and the mobile communication network, a temporary data transmission flow is first set up from the mobile station to the communication network. After the transmission of the message, the data transmission flow is deblocked. At the stage when the reply comes to the mobile communication network and further to the packet control unit, a temporary data transmission flow must be set up in the above-described manner, which may thus cause such a long delay in the reception of a reply message to the application that the application has already concluded that the connection was disconnected.

BRIEF SUMMARY OF THE INVENTION

It is an aim of the present invention to reduce the above-mentioned drawbacks and to provide a more effective method and system in packet format data transmission between a mobile station and a mobile communication network. The invention is based on the idea that after the last packet in the respective transmission of packets has been transmitted from the mobile station to the mobile communication network, the mobile communication network waits until it transmits an acknowledgement message to the mobile station. If, during this waiting time, the mobile communication network receives a packet which is directed to the mobile station, the mobile communication network can set up a downlink temporary block flow by using the radio resources of the uplink temporary block flow. It is thus possible to start setting up of a temporary block flow without first switching the mobile station to the idle mode. The method according to the invention is characterized in what will be presented in the characterizing part of the appended claim 1. The communication system according to the invention is characterized in what will be presented in the characterizing part of the appended claim 10. Further, the network element according to the invention is characterized in what will be presented in the characterizing part of the appended claim 24.

Considerable advantages are achieved with the present invention when compared with methods and systems of prior art. By the method of the invention, the transmission of packets to a mobile station can be started faster than in solutions of prior art, wherein the user of the mobile station does not need to wait for the beginning of the transmission as long as in solutions of prior art. Thus, the risk of disconnection of data transmission due to a long delay is smaller than in systems of prior art. Furthermore, by the invention, traffic on the control channel can be reduced when setting up a temporary block flow, wherein the resources of the mobile communication network can be utilized more efficiently.

BRIEF DESCRIPTION OF THE SEVERAL VIEWS OF THE DRAWINGS

In the following, the invention will be described in more detail with reference to the appended drawings, in which.

DETAILED DESCRIPTION OF THE INVENTION

In the following description of an advantageous embodiment of the invention, a GPRS-type wireless communication system shown in a reduced chart in FIG. 4 will be used as an example; however, it is obvious that the invention is not limited solely to this system but it can also be applied in other communication systems applying packet-format data transmission. In a mobile communication network NW applying the GPRS system, data transmission between a mobile station MS and a packet control unit PCU in the mobile communication network NW takes place preferably by means of a base station subsystem BSS.

Figure 3:
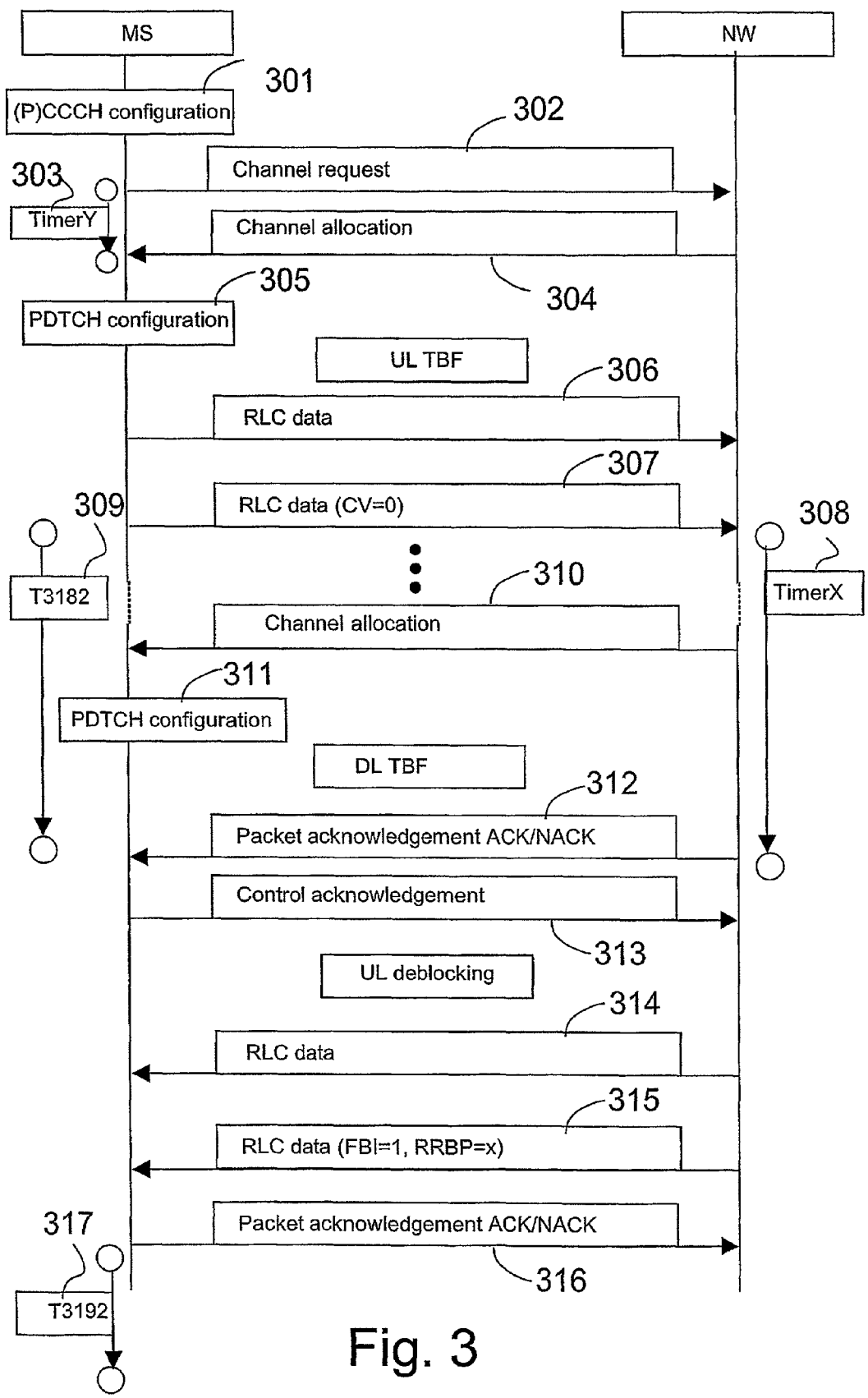
FIG. 3 shows the setting up of a packet connection between a mobile station and a mobile communication network according to an advantageous embodiment of the invention in a reduced signalling chart.

In the following, we shall first describe the transmission of packets from the mobile station MS to the mobile communication network NW with reference to the appended FIG. 3 which shows, in a reduced signalling chart, this setting up of a connection and transmission of packets between the mobile station MS and the mobile communication network NW. It is assumed that the mobile station MS is in idle state and that the mobile station MS listens to traffic on a control channel to detect messages possibly transmitted to the mobile station.

For data transmission, a control channel PCCCH is configured (block 301) to allocate resources for a packet connection. The mobile station transmits a packet resource allocation request 302 (PACKET_CHANNEL_REQUEST) to the mobile communication network NW for setting up a temporary block flow for the transmission of packets, if the mobile station MS has packets waiting for transmission. Furthermore, the mobile station MS preferably starts a timer TimerY to control the setting up of the connection (block 303). After receiving the resource allocation request 302, the mobile communication network NW examines if it has sufficient resources available at the moment to form a block flow. If there are sufficient resources, the mobile communication network NW, preferably the packet control unit PCU, starts the operations for setting up a temporary block flow. The packet flow is allocated e.g. the radio resources reserved for it, that is, which time slot or slots are allocated for the use of the block flow, and a temporary flow identifier (TFI). The packet control unit PCU transmits a packet flow assignment message 304 PACKET_UPLINK$_{13}$ ASSIGN-MENT via a base transceiver station BTS to the mobile station MS. This assignment message contains e.g. the above-mentioned information related to the temporary block flow. In this context, the mobile station MS preferably stops the control timer of the connection set-up and configurates the packet data traffic channel PDTCH (block 305). After performing the configuration operations required for setting up a temporary block flow, the mobile station MS can start packet transmission substantially immediately (block 306). The mobile station MS performs the packet transmission by using the radio resource allocated for the temporary block flow, i e. in one or more time slots allocated for the block flow. At the stage when the mobile station MS transmits the last packet 307 to be transmitted in the block flow, the mobile station MS preferably sets information on this in the packet address field, such as the countdown value CV to the value zero.

When the mobile communication network NW has received the last packet 307 of said block flow from the mobile station MS in a situation in which there is no downlink block flow between the mobile station MS and the mobile communication network NW, the mobile communication network does not at once transmit the acknowledgement message in which the final bit (FAI) is set to the value true, but waits for some time. To measure this waiting time, the mobile communication network NW preferably starts a timer TimerX (block 308). How long a time is set as the waiting time will depend on the mobile communication system used at a time. For example, in the GPRS system, this time is preferably set to a value which is smaller than 5 s, for example to a value from 0.5 to 1 s. Said upper limit 5 s is determined by the fact that the mobile station MS of the GPRS system will start a timer T3182 (block 309) at the stage when the mobile station MS has transmitted the last packet. On the other hand, by setting the waiting time as long as possible, close to the upper limit, the mobile communication network will have more time to receive a possible packet addressed to the mobile station, wherein a greater probability is achieved that the uplink is not disconnected until the arrival of such a packet. Thus, in this preferred embodiment of the invention, the acknowledgement message of the respective temporary block flow, by which all the data packets are acknowledged as received, is preferably delayed. However, it is obvious that the invention is not limited solely to the time values given above.

The timer T3182 is used to control the reception of an acknowledgement in time, i.e. within about 5 s from the transmission of the packet. If the mobile communication network NW does not transmit an acknowledgement before the expiry of the time measured by the timer T3182, the mobile station MS will terminate the block flow and assume that an error situation has occurred in the connection used in the packet flow. It is naturally obvious that the numerical values used in this example are used to clarify but not to restrict the invention.

If the mobile communication network NW, within the waiting time, receives a packet to be transmitted to the mobile station MS, the following steps are taken in this preferred embodiment of the invention. To start the transmission of packets from the mobile communication network NW to the mobile station MS, the measures for setting up a temporary block flow are started. The mobile communication network NW allocates one or more packet data traffic channels (PDTCH) for the connection. The number of channels (e.g. time slots) to be allocated is affected e.g. by the settings by the operator of the mobile communication network NW, the quality of service to be allocated for the connection, the packet connection properties of the receiving mobile station, etc. The mobile communication network NW transmits a packet downlink assignment 310 to the mobile station MS which configures the temporary block flow (block 311) on the basis of data transmitted in the packet downlink assignment. In the packet downlink assignment, it is possible to transmit e.g. a temporary flow identity (TFI), timing data, on the basis of which the mobile station can estimate the starting moment of the transmission of the data packets, as well as information on the time slot or time slots in which the packets of the packet connection are transmitted. For transmitting the packet downlink assignment, the radio resources of the existing uplink block flow are preferably used. In practice, this can be implemented in such a way that the packet downlink assignment 310 is transmitted in a control channel (PAACH) corresponding to the packet channel which the mobile communication network NW can use e.g. to transmit acknowledgements to the mobile station MS. The mobile station listens to traffic on this control channel. For receiving packets, the mobile station is switched to a packet transfer mode and preferably starts a timer. For this timer, the identification T3190 is used in the GPRS system.

At this stage, or after the timer TimerX has counted the set time, the mobile communication network NW will acknowledge the uplink packets by transmitting an acknowledgement message PACKET UPLINK ACK/NACK 312, whereby the mobile communication network informs the mobile station which packets were received by the mobile communication network. To this acknowledgement message, the mobile station MS can transmit a reply message PACKET CONTROL ACK 313, whereby the mobile station MS informs the mobile communication network NW that it has received the acknowledgement message. If transmission errors occurred in the transmission of the packets, the mobile station can use the received acknowledgement message to find out which packets should be retransmitted, which is known as such.

At the stage when the mobile station has transmitted the reply message PACKET CONTROL ACK 313 to the acknowledgement message, the mobile station MS unpacks the uplink temporary block flow. After receiving a packet downlink assignment, the mobile station MS will either at once or, if a starting time was given in the assignment message, at the latest after the expiry of this starting time to receive packets to be transmitted in a downlink packet flow from the mobile communication network NW. It is thus possible to transmit both acknowledgement messages and downlink data packets simultaneously to the mobile station MS.

The function of said timer T3190 is to prevent that the mobile station is left in a packet receiving mode in error situations and after the end of transmission of packets. Error situations can occur e.g. when the mobile station cannot, for any reason, receive packets or the mobile communication network does not transmit packets. In this description, error situations will not be discussed in more detail, but it is prior art known as such.

The mobile communication network transmits packets on a packet data traffic channel PDTCH (arrow 314). The mobile station MS receives each packet and transmits an acknowledgement, if it was requested by the mobile communication network NW. By means of the acknowledgement, the mobile station MS can inform the mobile communication network NW either that the packet was received correctly (ACK) or that errors occurred in the reception (NACK). If the mobile communication network NW has requested for transmission of acknowledgements, the mobile station MS can, in connection with the acknowledgement, also inform the mobile communication network NW of a need to transmit packets as long as such a temporary block flow DL TBF is activated.

In the last packet to be transmitted (arrow 315), the mobile communication network NW sets data about the end of packets, e.g. a final block indicator (FBI) in the packet header to the value true (e.g. logical 1 state). Thus, the mobile station MS knows that this was the last packet to be received in the block flow. The mobile station transmits an acknowledgement in the mobile communication network (arrow 316) and starts a second timer, such as T3192 in the GPRS system (block 317).

The purpose of starting said timer T3192 is e.g. to prevent that the mobile station MS remains waiting for messages transmitted by the mobile communication network NW for an unnecessarily long time, e.g. in error situations. Thus, if the mobile station MS does not receive e.g. a packet downlink assignment 310 from the mobile communication network NW until the time set in the timer T3192 has expired, the mobile station MS is preferably switched to idle mode in a way known as such.

In communication between two parties, it is common that when data transmission ends in one direction, there is a need to transmit information also in the other direction. Thus, in the solution according to the invention, by waiting for a while before transmitting an acknowledgement, the probability is increased that the need for a downlink block flow will be detected in the mobile communication network NW before the uplink block flow has been deblocked. By the arrangement of the invention, it is also possible to reduce the loading of common control channels, because a resource allocation request can, in situations similar to that described above, be implemented by using such a data channel which is allocated at least for the mobile station in question. Control channel resources are thus released for other message transmission.

Figure 1:
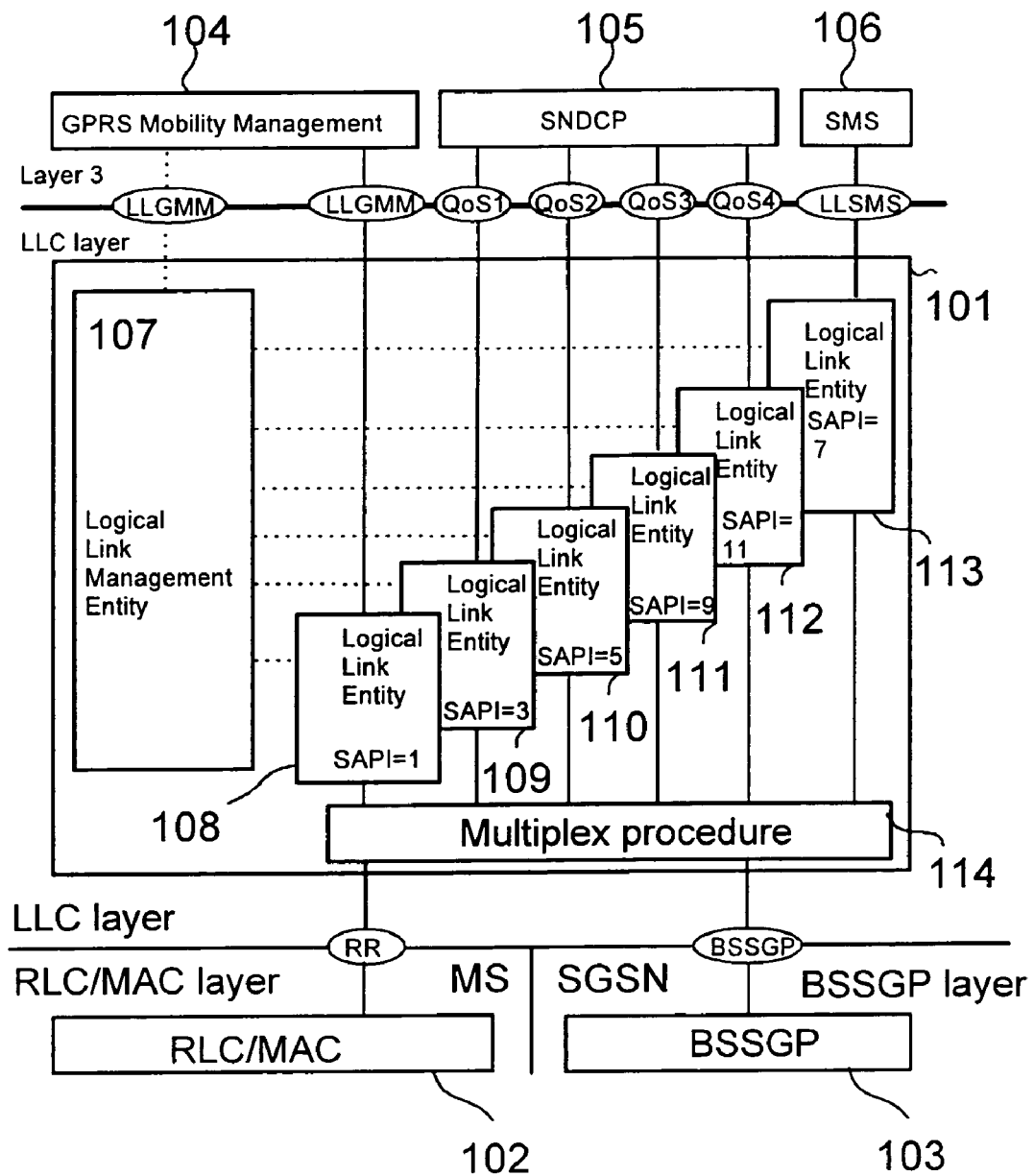
FIG. 1 shows a protocol stack according to prior art.
Figure 2:
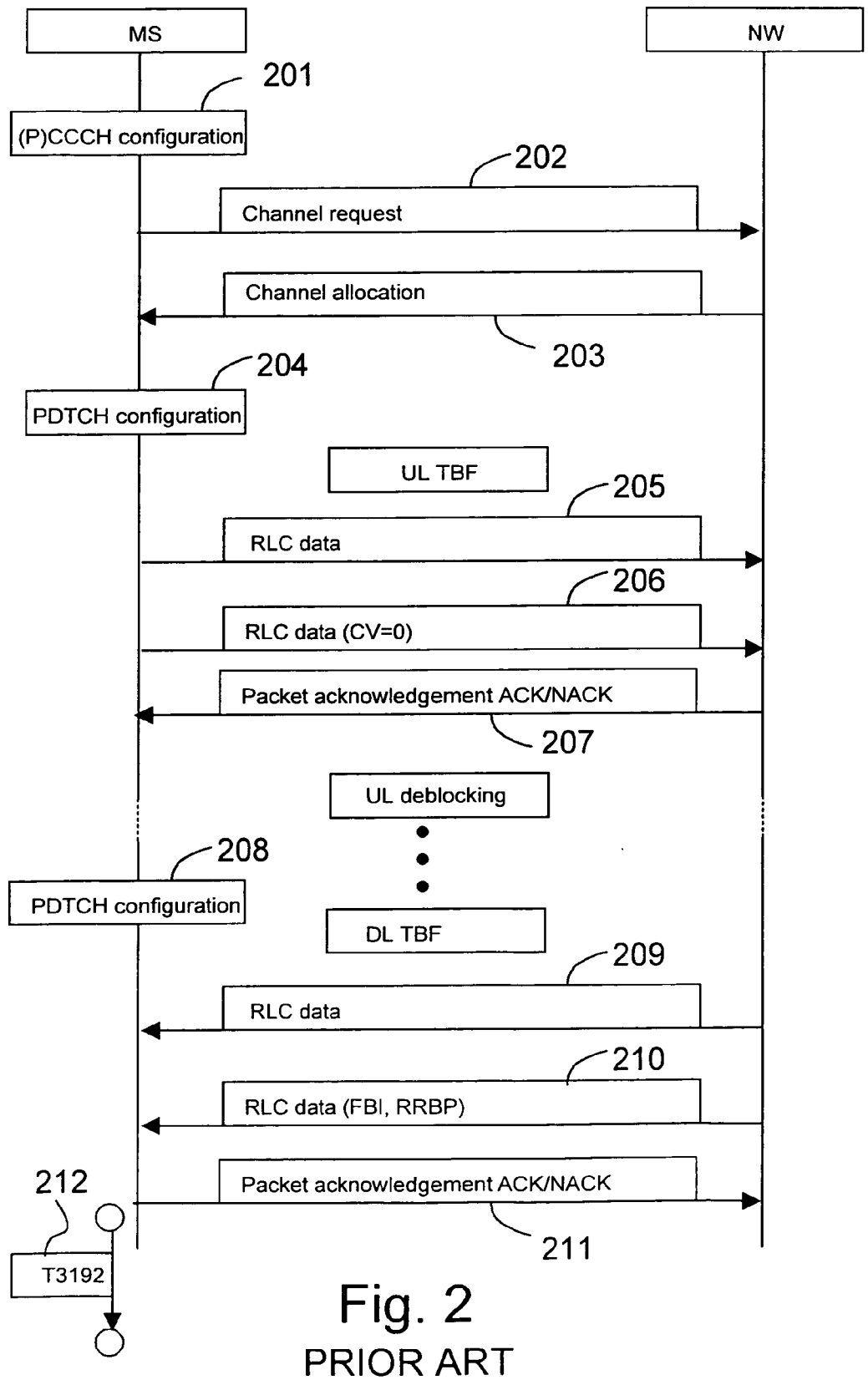
FIG. 2 shows the setting up of a packet connection according to prior art in a reduced signalling chart.

Packets to be transmitted in temporary block flows can be e.g. packets used for transmitting information of an application, wherein information packets are transferred in a way known as such from the application level to lower layers in the protocol stack to be transmitted as packets of the RLC/MAC layer. In a subnetwork dependent convergence protocol (SNDCP) block, the packets are divided, if necessary, in different strings according to the demands for quality of service defined in each packet. FIG. 1 illustrates as an example four quality of service (QoS) classes: first class, second class, third class, and fourth class. In view of applying the present invention, however, the quality of service demands set for the different packets are not significant as such.

The SNDCP block transfers the packets via a service access point (SAP) block corresponding to the quality of service to the LLC layer. This logical link control layer is preferably provided with one logical link entity (LLE) block for each packet string corresponding to a quality of service class.

The LLE block implements the functions of the LLC protocol layer, such as possible retransmissions of packets. Underneath the LLC layer, in the interface between the mobile station and the mobile communication network, the protocol stack of FIG. 1 comprises a radio link control/medium access control (RLC/MAC) layer. In this protocol according to the example used, this is implemented with one RLC block which is responsible e.g. for requesting for the allocation of resources from the mobile communication network for all the packets to be transmitted on the radio channel.

FIG. 1 shows a data transmission connection formed between the LLE block and the RLC block via the RR interface, but it is obvious that also an arrangement consisting of several RLC blocks can be used in connection with the invention.

Figure 4:
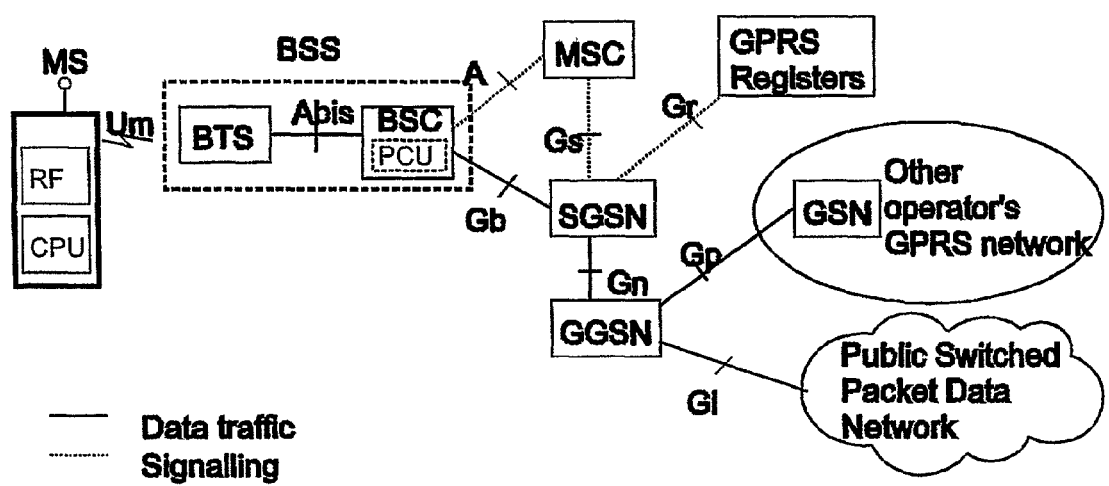
FIG. 4 shows an advantageous system in which the invention can be applied.

FIG. 4 shows connections of a telecommunication network in a packet switched GPRS service. The main element for GPRS services in the network infrastructure is a GPRS support node, so-called GSN. It is a mobility router implementing the connection and cooperation between different data networks, e.g. via a connection Gi to a public switched packet data network PSPDN or via a connection Gp to the GPRS network of another operator, mobility management with GPRS registers via a connection Gr, and the transmission of data packets to mobile stations MS irrespective of their location. Physically, the GPRS support node GSN can be integrated in a mobile switching center MSC, or it can be a separate network element based on the architecture of data network routers. User data is passed directly between the support node GSN and a base station subsystem BSS consisting of base transceiver stations BTS and base station controllers BSC, via a connection Gb, but there is a signalling connection Gs between the support node GSN and the mobile switching center MSC. In FIG. 4, solid lines between blocks indicate data traffic (ie. the transmission of speech or data in digital format), and broken lines indicate signalling. Physically, data can be passed transparently via the mobile switching center MSC. The radio interface between the mobile station MS and the fixed network extends via the base transceiver station BTS and is indicated with the reference Um. The references Abis and A indicate the interfaces between the base transceiver station BTS and the base station controller BSC and between the base station controller BSC and the mobile switching center MSC, which is a signalling connection, respectively. The reference Gn indicates a connection between different support nodes of the same operator. The support nodes are normally divided into gateway support nodes GGSN and serving or home support nodes SGSN, as shown in FIG. 4. The GSM system is a time division multiple access (TDMA) system in which traffic on the radio way is time-divided, taking place in successive TDMA frames, each of them consisting of several (eight) time slots. In each time slot, an information packet is transmitted as a radio frequency burst having a definite duration and consisting of a sequence of modulated bits. The time slots are primarily used as control channels and traffic channels. Traffic channels are used for the transmission of speech and data, and control channels are used for signalling between the base tranceiver station BTS and mobile stations MS.

The RLC/MAC block according to the invention, as well as its functionality, can be implemented in devices used in present mobile communication systems by modifications in the software, primarily in the parts of implementing the protocol stacks in the mobile communication network, e.g. in the packet controller unit PCU.

The present invention is not limited solely to the embodiments presented above, but it can be modified within the scope of the appended claims. The invention can also be applied e.g. in the Universal Mobile Telecommunication System (UMTS).

The invention claimed is:

1. A method for arranging the transmission of packets between a mobile communication device and a mobile communication network comprising:

setting up at least one temporary block flow for transmitting packets between the mobile communication device and the mobile communication network;

using said at least one temporary block flow on one or more packet data traffic channels to transmit data in packets in a first direction from the mobile communication device to the mobile communication network;

at the end of the transmission in said at least one temporary block flow in the first direction, setting information in the last packet to be transmitted about the end of the packet flow;

acknowledging the reception of the packets by the mobile communication network; after the end of the transmission of packets in said first direction, the mobile communication network waiting a determined time before transmitting an acknowledgement; and if, during the waiting time, the mobile communication network detects a need for transmission of packets in a second direction from the mobile communication network to the mobile communication device, the method further comprises setting up at least one packet data traffic channel for data transmission in said second direction, and including a final ack indicator in said acknowledgement.

2. The method according to claim 1, wherein the setting up of temporary block flows is performed in one or several control channels by means of signalling data to be transmitted.

3. The method according to claim 1, wherein the setting up of at least one packet data traffic channel in said second direction is performed on a control channel corresponding to the temporary block flow set up in the first direction.

4. The method according to claim 1, wherein the method takes place according to a protocol stack comprising at least a radio link control/media access control layer.

5. The method according to claim 1, wherein said acknowledgement is transmitted substantially immediately after the setting up of said at least one packet data traffic channel.

6. The method according to claim 1, wherein said acknowledgement is transmitted substantially immediately after the waiting time has expired.

7. The method according to claim 1, wherein in the first direction of data transmission, the information used for ending of the packet flow is a countdown value.

8. The method according to claim 1, wherein in the method, the time taken in setting up of a temporary packet connection is controlled and determined a maximum time, wherein said waiting time is set shorter than said maximum time.

9. The method according to claim 1, wherein in the method, the acknowledgement message with which all the data packets are acknowledged as received, is delayed.

10. The method according to claim 1 comprising setting the final ack indicator to a value '1'.

11. The method according to claim 1 comprising using a countdown value as said information about the end of the packet flow.

12. The method according to claim 11 comprising setting the countdown value to a value zero.

13. A communication system in which information is arranged to be transmitted in packet format between a mobile communication device and a mobile communication network and which communication system comprises:

a packet data network for packet transmission between the mobile communication device and the mobile communication network in at least one temporary block flow configured to transmit information in one or several packet data traffic channels in a first direction from the mobile communication device to the mobile communication network;

said mobile communication device being configured to set information about the end of the block flow in the last packet to be transmitted when data transmission is at end in the block flow;

said mobile communication network being configured to send an acknowledgement to acknowledge the receipt of packets; wherein the mobile communication network comprises a timer for waiting a certain time after the end of transmission of packets in said first direction before transmitting said acknowledgement; and a receiver for receiving packets addressed to the mobile communication device, wherein said packet data network is configured to set up at least one packet data traffic channel for data transmission in a second direction from the mobile communication network to the mobile communication device, wherein if the mobile communication network has, during the waiting time, detected a need for packet transmission, said packet data network being configured to set up said at least one packet data traffic channel for data transmission in the second direction before the transmission of said acknowledgement;

wherein said acknowledgement comprises a final ack indicator.

14. The communication system according to claim 13, wherein the setting up of temporary block flows is arranged to be performed by signalling data to be transmitted in one or several control channels.

15. The communication system according to claim 13, wherein the setting up of temporary block flows in said second direction is arranged to be performed in a control channel corresponding the temporary block flow in the first direction.

16. The communication system according to claim 13, wherein the mobile communication device and the mobile communication network are provided with a protocol stack for processing information to be transmitted, the protocol stack comprising at least a radio link control/media access control layer.

17. The communication system according to claim 13, wherein said acknowledgement is arranged to be transmitted substantially immediately after the formation of said at least one packet data traffic channel.

18. The communication system according to claim 13, wherein said acknowledgement is arranged to be transmitted substantially immediately after the expiry of a waiting time.

19. The communication system according to claim 13, wherein the mobile communication network is a general packet radio service network.

20. The communication system according to claim 13, wherein the receiver for receiving packets addressed to the mobile communication device comprise a packet control unit.

21. The communication system according to claim 20, comprising a base station controller, wherein the packet control unit is placed in the base station controller.

22. The communication system according to claim 20, comprising a base transceiver station, wherein the packet control unit is placed in the base transceiver station.

23. The communication system according to claim 20, comprising a serving support node, wherein the packet control unit is placed in the serving support node.

24. The communication system according to claim 13, wherein in the first direction of data transmission, the information used on the end of the block flow is arranged to be a countdown value.

25. The communication system according to claim 13, wherein in the communication system, the time taken in the formation of a temporary packet connection is arranged to be controlled and is allocated a maximum time, wherein said waiting time is arranged to be shorter than said maximum time.

26. The communication system according to claim 13, wherein in the communication system, the acknowledgement with which all data packets are acknowledged as received, is arranged to be delayed.

27. The communication system according to claim 13 wherein said final ack indicator has a value '1'.

28. A network element to be used in a communication system in which information is arranged to be transmitted in packet form between a mobile communication device and a mobile communication network, the communication system comprising:
- a packet data network for packet transmission between the mobile communication device and the mobile communication network in at least one temporary block flow configured to transmit information in one or several packet data traffic channels in a first direction from the mobile communication device to the mobile communication network;
- said mobile communication device being configured to set information about the end of the block flow in the last packet to be transmitted when data transmission is at end in the block flow;

wherein the network element is configured to send an acknowledgement to acknowledge the receipt of packets; and the network element comprises:
- a timer for waiting a certain time after the end of transmission of packets in said first direction before transmitting said acknowledgement; and
- a receiver for receiving packets addressed to the mobile communication device, wherein the network element is configured to set up at least one packet data traffic channel for data transmission in a second direction from the mobile communication network to the mobile communication device, wherein if the network element has, during the waiting time, detected a need for packet transmission, the network element is configured to set up said at least one packet data traffic channel for data transmission in the second direction before the transmission of said acknowledgement;

wherein the network element is configured to include a final ack indicator in said acknowledgement.

29. The network element according to claim 28 configured to set said final ack indicator into a value '1'.

* * * * *